United States Patent
Gao et al.

(10) Patent No.: US 9,727,317 B2
(45) Date of Patent: Aug. 8, 2017

(54) OPTIMIZED COMPILATION USING AN AUTO-TUNED COMPILER AS A SERVICE

(71) Applicant: International Business Machines Corporation, Armonk, NY (US)

(72) Inventors: Yaoqing Gao, Ontario (CA); John R. MacMillan, Ontario (CA); Jeremiah S. Swan, Ontario (CA); Trong Truong, Ontario (CA); Kobimanalan Vinayagamoorthy, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/932,032

(22) Filed: Nov. 4, 2015

(65) Prior Publication Data
US 2017/0123773 A1 May 4, 2017

(51) Int. Cl.
*G06F 9/45* (2006.01)
(52) U.S. Cl.
CPC ................... *G06F 8/443* (2013.01)
(58) Field of Classification Search
CPC ................................................ G06F 8/443
See application file for complete search history.

(56) References Cited

U.S. PATENT DOCUMENTS

| | | | |
|---|---|---|---|
| 6,279,151 B1 * | 8/2001 | Breslau | G06F 8/423 717/140 |
| 6,971,091 B1 | 11/2005 | Arnold et al. | |
| 8,479,178 B2 | 7/2013 | Aharoni et al. | |
| 9,009,681 B2 | 4/2015 | Schmidt | |
| 2007/0283098 A1 * | 12/2007 | O'Brien | G06F 9/30047 711/118 |
| 2009/0024986 A1 | 1/2009 | Meijer et al. | |
| 2014/0026127 A1 | 1/2014 | McEwan | |

OTHER PUBLICATIONS

Harshal et al; Compiler as Service over Cloud, International Journal of Computer Applications (0975-8887), vol. 70—No. 1, May 2013.

* cited by examiner

*Primary Examiner* — Camquy Truong
(74) *Attorney, Agent, or Firm* — Garg Law Firm, PLLC; Rakesh Garg; Christopher K. McLane (57) ABSTRACT

A source code is pre-processed to form a pre-processed source code. The source code refers to an external code in a separate file, and the pre-processed source code creates a single file that includes the source code and the external code. The source code is profiled to create profile information identifying a hot portion having a first degree of hotness. A set of environment parameter values is determined to be applicable to a data processing system where the application will execute. At a remote optimizing compiler, a selection of a set of compiler options from a knowledgebase corresponding to the profile information and the set of environment parameter values is caused and an object code resulting from compiling the pre-processed source code using the set of compiler options is obtained. The object code is optimized according to the profile information and the set of environment parameter values.

18 Claims, 5 Drawing Sheets

OPTIMIZED COMPILATION USING AN AUTO-TUNED COMPILER AS A SERVICE

TECHNICAL FIELD

The present invention relates generally to a method, system, and computer program product for creating an optimized compiled code. More particularly, the present invention relates to a method, system, and computer program product for optimized compilation using an auto-tuned compiler as a service.

BACKGROUND

Source code in a high-level programming language is compiled to produce object code. The object code is linked to one or more libraries to produce machine code or executable code. The machine code is executed on a data processing system to perform the operations programmed in the source code.

An optimizing compiler (OC) is a compiler that can optimize the object code so that the corresponding machine code executes with a desired level of efficiency. A compiler can optimize different portions of the object code differently. For example, if a portion of a given source code is called above a threshold number of times, a compiler might make the corresponding portion of the object code more efficient as compared to the object code portion that corresponds to another portion of the source code that is called below the threshold number of times.

A compiler is software. Software as a Service (SaaS) model is a model for making software available for use in the form of a service over a data network. In a SaaS model, the capability of the compiler is provided to a user by executing the compiler in a cloud infrastructure as needed by the user. The user can access the compiler from a variety of client devices through a thin client interface such as a web browser or another light-weight interface. The user does not manage or control the underlying cloud infrastructure including the network, servers, operating systems, or storage. The user configures the compiler for compiling the user-provided source code. An optimizing compiler can be similarly provided as a Service—optimizing compiler as a service (OCaaS).

SUMMARY

The illustrative embodiments provide a method, system, and computer program product. An embodiment pre-processes a source code of an application to form a pre-processed source code, where the source code refers to an external code in a separate file, and wherein the pre-processed source code creates a single file that includes the source code and the external code. The embodiment profiles the source code to create profile information, the profile information identifying a hot portion having a first degree of hotness. The embodiment determines a set of environment parameter values, the set of environment parameter values being applicable to a data processing system where the application will execute. The embodiment causes, at a remote optimizing compiler, a selection of a set of compiler options from a knowledgebase, the selection corresponding to the profile information and the set of environment parameter values. The embodiment obtains, from the remote optimizing compiler, an object code resulting from compiling the pre-processed source code using the set of compiler options, where the object code is optimized according to the profile information, and the set of environment parameter values. The embodiment builds the executable application using the optimized object code.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The performance of an application is a critical success factor for a data processing system platform. Compilation of the application source code using different compilers can produce different compilation results. The same compiler can also produce different compilation results by using different compiler settings. The different compilation results can have differing performances. Therefore, the illustrative embodiments recognize that selection of the compiler and selecting the compiler settings for a compilation job is important to obtain acceptable performance from an application on a given data processing system.

The illustrative embodiments further recognize that the output of a compiler is dependent not only on the type of the compiler and the settings used with the compiler, but also on the environment parameters of the data processing system where the application is going to operate. Therefore, the illustrative embodiments also recognize that configuring a selected compiler such that the compiler produces an object file that is tuned to a given data processing system is also important to obtain acceptable performance from an application on the data processing system (target platform).

Optimizing compilers are used to automatically optimize the output object code in order to improve the application performance. However, the illustrative embodiments recognize that a user, such as an application porter, faces significant challenges in taking advantage of the optimizing compiler technology that may be available for the target platform.

For example, presently, users gravitate to the default compiler gcc for compiling C/C++ code for Linux® based platforms (Linux is a trademark of Linus Torvalds in the United States and other countries). Generally, a user tends to use a compiler with which the user is familiar, a compiler that is readily available for the platform—such as from the platform's manufacturer, a compiler that is popular in the industry of the user's team, or some combination of these and other reasons. The illustrative embodiments recognize that selecting a compiler on these bases can potentially leave a significant amount of the possible performance unrealized for a given application on a given platform.

As an alternative, a user can use an optimizing compiler that is tuned for the platform on which the user expects to operate the application. One example of such platform-tuned optimizing compiler is xlc. However, the illustrative embodiments recognize that using a platform-tuned optimizing compiler requires that the user have a fully licensed version of the optimizing compiler installed on the platform, the user set up the optimizing compiler to work with the user's makefile, and that the user be knowledgeable about the compiler settings that might be best suited for compiling the particular application. The illustrative embodiments recognize that factors such as these can be significant roadblocks in obtaining a desirable output from a platform-tuned optimizing compiler.

The illustrative embodiments used to describe the invention generally address and solve the above-described problems and other problems related to using a compiler to improve a performance of an application.

An embodiment can be implemented as a software application. The application implementing an embodiment can be configured as a modification of an existing client application configured to operate according to the SaaS model.

In many cases, the source code of a given application references other code. Such other code can be located in other files that are included by reference in the source code, or may be external to the source code and referenced from within the source code in other ways. When a user uses a compiler that is locally resident on a machine used by the user, the compiler is able to resolve the external references over the data network accessible to the machine. When the compiler is remote, such as in the case of OCaaS, the compiler may not be able to resolve an external reference because the infrastructure where the compiler is operating may not have access to the network resources where the referenced code might reside.

An embodiment pre-processes a given source code. The pre-processing resolves all external references made in the code such that the referenced code outside the source code is included in the source code. The result of the pre-processing is a pre-processed source code, which only references code that is within the single file of the pre-processed source code. As a non-limiting example, an embodiment uses a local compiler to produce the pre-processed source code. Any suitable method for producing the pre-processed source code can be used within the scope of the illustrative embodiments.

A dynamic profiler is tool for performance analysis of executable code that measures aspects of the execution such as call frequency, time, memory, other metrics made available by the execution environment, or derived metrics calculated from other metrics, and produces profile information for the code. Other performance analysis tools predict estimated performance profile information from examining the source code.

The profile information identifies various portions or sections of the source code and associates a degree of hotness or coldness to a portion based on the metrics for that portion. If the profiling information uses one threshold metric A, a portion can be hot or cold when the corresponding metric is greater than A or less than or equal to A, respectively. Similarly, if two thresholds A and B are used, a portion can be hot when the corresponding metric is greater than A, normal when the corresponding metric is greater than B and up to A, or cold when the corresponding metric is up to or lower than B.

Not all profilers can produce the profile information that is consumable by a particular compiler. Generally, the profiling tool that produces the profile information has to be compatible with the compiler that will be used to optimize the source code based on that profile information.

An embodiment selects a profiling tool that is compatible with an OCaaS that is planned for use in compiling the pre-processed source code. The embodiment profiles the source code using a profiling tool. One embodiment profiles the pre-processed source code using the profiling tool. The profiling operation associates various degrees of hotness with various portions of the source code or the pre-processed source code, as the case may be.

An embodiment further identifies a set of environment parameters that describe the platform on which the compiled application of the source code is expected to operate. An environment parameter describes a hardware, software, or firmware used in the platform. For example, one parameter may describe a hardware model or type of the platform, another parameter may describe a version of the operating system operating on the platform, another parameter may describe a license available or not available for use on the platform, and the like. Any number of environment parameters can be used in the set to describe these and other characteristics of the platform.

An embodiment further presents a visualization of the collected information to a user. For example, the embodiment presents the structure of the source code—such as the functions implemented therein or references made therefrom, profiling information associated with the various portions of the source code, and the files where the source code portions or external references reside.

The visualization accepts an input from the user to select or otherwise identify the various levels of optimization to apply to the various portions according to their profile information. For example, the user may select those portions whose hotness is between one range of hotness and opt to apply a particular level of optimization to that selection, and the user may select those portions whose hotness is between a different range of hotness and opt to apply a different level of optimization to that selection. Any number of selections can be input based on any type of selection criteria without limitation within the scope of the illustrative embodiments.

An embodiment supplies the pre-processed source code, the profile information or the selections based thereon, and the set of environment parameters to an OCaaS. By supplying the profile-based selections and the environment parameters, the embodiment causes the optimizing compiler to access a knowledgebase of settings.

The knowledgebase of settings according to an embodiment includes information about the compiler options—settings—that produce a given level of performance for a given profile of a given code on a given platform. The knowledgebase includes many such settings for one or more levels of performances, for one or more different hotness or coldness level profiles, for one or more different platform configurations, or different combinations thereof. By providing with the pre-processed source code the profile-based selections and the environment parameters, the embodiment enables the OCaaS to select from the knowledgebase a set of compiler options that will produce the best performance given the profile of the selected portions of the code and the platform on which the application will be operated.

The embodiment causes the OCaaS to compile the pre-processed source code with the selected set of compiler options. The embodiment obtains optimized object code as a result of the compilation. In some cases, the embodiment may also obtain one or more high-performance libraries from the OCaaS, which can be used in linking the optimized object code to achieve the expected performance on the platform according to the knowledgebase.

Optionally, an embodiment may also contribute to the knowledgebase. For example, when the optimized object file is converted to an executable of the application, the embodiment collects actual performance information from the operation of the executable on the platform. The embodiment provides the profile information, the set of environment parameters, and the actual performance data to create or modify an entry in the knowledgebase for future use.

A method of an embodiment described herein, when implemented to execute on a device or data processing system, comprises substantial advancement of the functionality of that device or data processing system in optimized compilation using an auto-tuned compiler as a service. For example, presently available compilation processes either use sub-optimal compilers due to familiarity or require significant knowledge to use an optimizing compiler to extract a desirable performance from the compiled product. An embodiment configures an optimizing compiler as an OCaaS. The embodiment further configures the OCaaS to use a knowledgebase of compiler settings for various combinations of profile information and platform information. An embodiment further causes the OCaaS to select the most suitable compiler settings from the knowledgebase by supplying the OCaaS the profile information of a source code and the platform information of the platform where the compiled product will operate. This manner of optimized compilation using an auto-tuned compiler as a service is unavailable in the presently available methods. Thus, a substantial advancement of such devices or data processing systems by executing a method of an embodiment is in enabling the creation of a compiled code by using an optimizing compiler in a SaaS model and by enabling the optimizing compiler to self-tune to the performance requirements on the specified platform to produce compiled code that can deliver the desired performance.

The illustrative embodiments are described with respect to certain code, compilers, performance requirements, profile information, environment parameters, knowledgebase entries, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
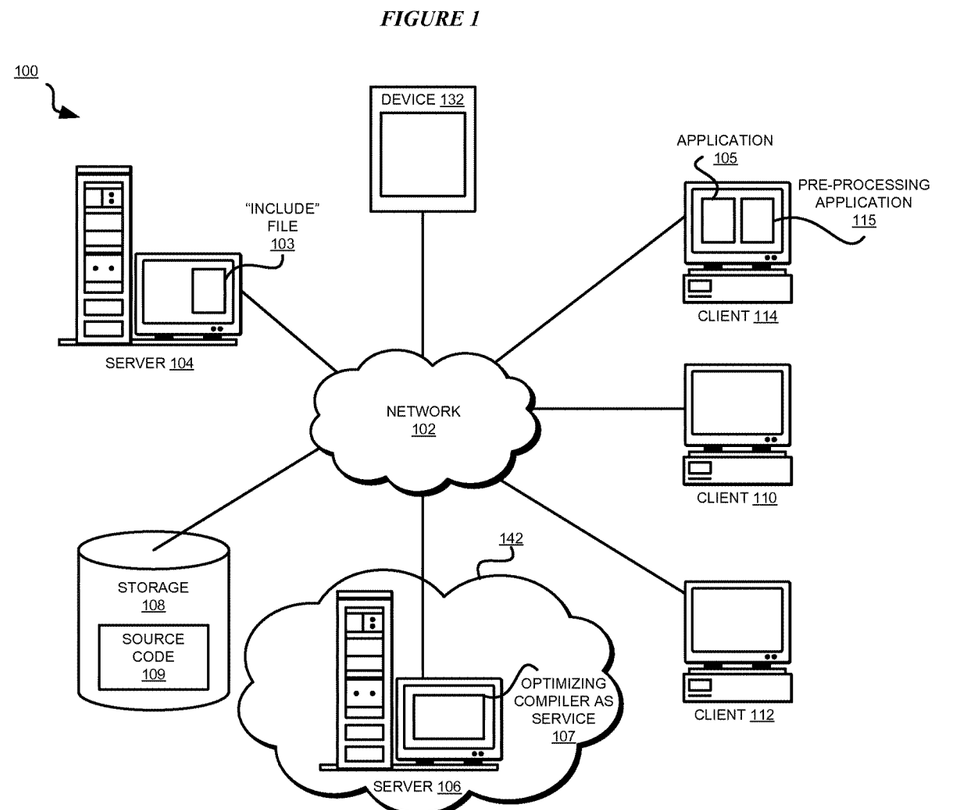
FIG. 1 depicts a block diagram of a network of data processing systems in which illustrative embodiments may be implemented.
Figure 2:
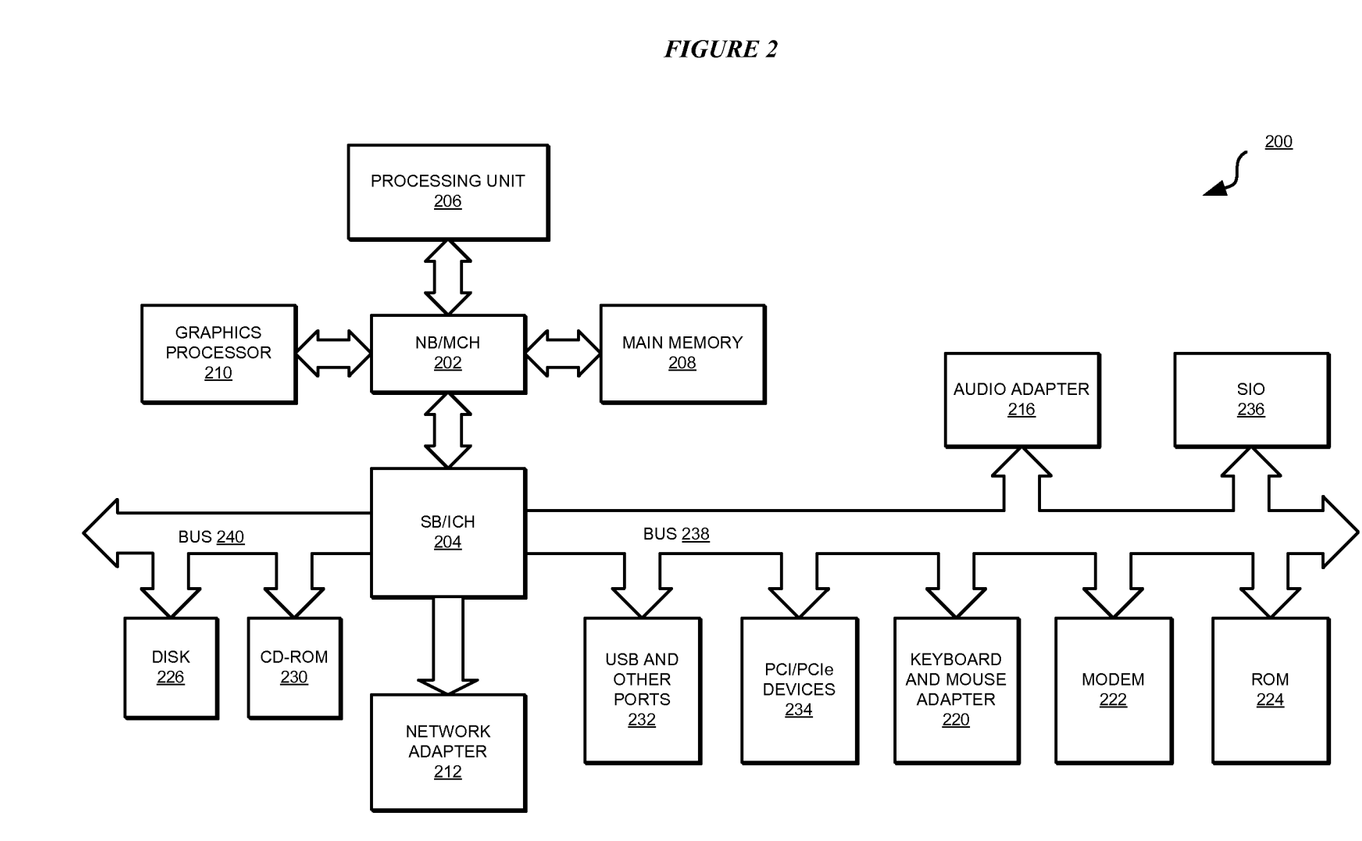
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 uses pre-processing application 115 to produce a pre-processed source code from source code 109. Source code 109 may include an external reference, such as by incorporating non-limiting "include" file 103 by reference. OCaaS 107 executes in a cloud infrastructure, such as on server 106 in cloud 142.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
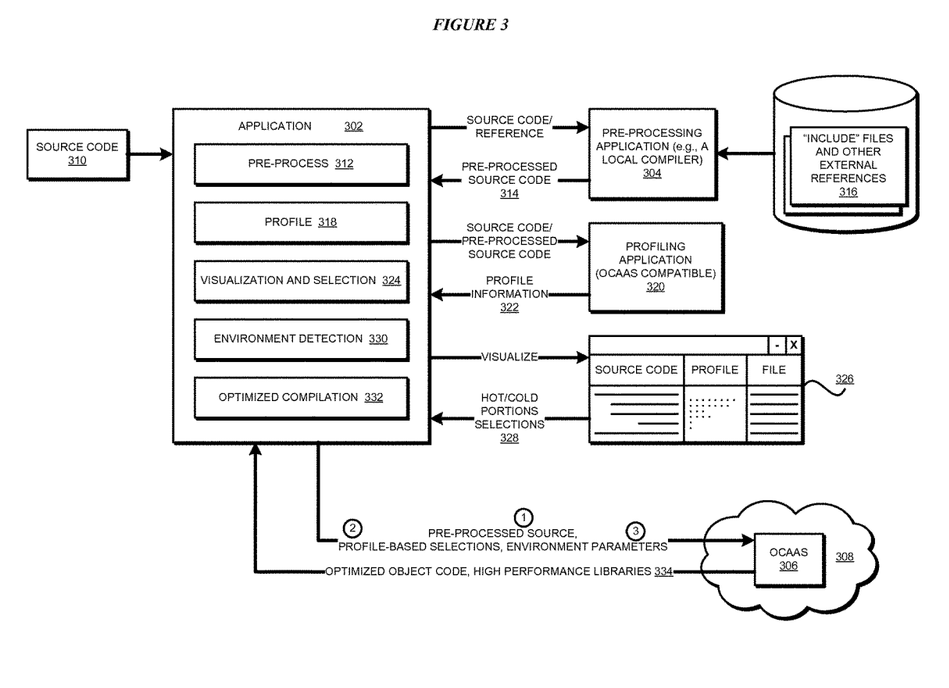
FIG. 3 depicts a block diagram of an example configuration for optimized compilation using an auto-tuned compiler as a service in accordance with an illustrative embodiment.

With reference to FIG. 3, this figure depicts a block diagram of an example configuration for optimized compilation using an auto-tuned compiler as a service in accordance with an illustrative embodiment. Application 302 is an example of application 105 in FIG. 1.

Pre-processing application 304 is an example of pre-processing application 115 in FIG. 1. A non-limiting example of pre-processing application 304 may be a local compiler accessible to the user.

Application 302 interacts with OCaaS 306, which operates in cloud infrastructure 308. OCaaS 306 is an example of OCaaS 107 in FIG. 1. Cloud 308 is an example of cloud 142 in FIG. 1.

Application 302 accepts as input source code 310. Source code 310 is an example of source code 109 in FIG. 1.

Component 312 supplies code 310, or a reference to source code 310, to pre-processing application 304. Pre-processing application 304 resolves any external references in source code 310 and provides pre-processed source code 314 to application 302. For example, pre-processing application 304 incorporates code 316 into pre-processed source code 314 where code 316 is contained in an include file or located at another external reference referenced from source code 310.

Component 318 supplies source code 310 or pre-processed source code 314 to profiling application 320. Profiling application 320 is compatible with OCaaS 306 in that profiling information 322 produced from profiling application 320 is understood by and usable by OCaaS 306. Application 302 receives profiling information 322 from profiling application 320.

Component 324 presents visualization 326 on a graphical user interface. In one embodiment, component 324 presents various identifiable portions of source code 310 —such as the separate and identifiable functions implemented in source code 310, profile information associated with some or all such portions—such as whether a function is hot or cold with a corresponding degree of the hotness or coldness, and files in which those portions are located.

These examples of visualization 326 are not intended to be limiting. From this disclosure, those of ordinary skill in the art will be able to conceive many other types of information to visualize and manners in which to visualize them, and the same are contemplated within the scope of the illustrative embodiments.

A user or a system selects one or more portions from visualization 326. In one embodiment, the selection of a portion is based on whether the portion has a degree of hotness that exceeds a threshold degree of hotness the user or system has selected for the selection.

Application 302 receives selection 328, to wit, one or more portions selected by the user or system, from visualization 326. Component 324 is able to associate a selected portion with the corresponding profile information for the selected portion.

Component 330 detects, receives, or otherwise determines the data processing environment parameters that would be applicable to the platform where the executable of source code 310 will operate. Accordingly, component 330 collects the values of a set of environment parameters from the platform.

Component 332 sends (1) pre-processed source code 314, (2) either all of profile information 322 or profile-based selections 328, and (3) a set of environment parameters produced by component 330, to OCaaS 306. Application 302 obtains from OCaaS 306 optimized object code 334. Optionally, application 302 also obtains one or more high-performance libraries, or one or more references thereto, to link with optimized object code 334 in the construction of the executable code corresponding to source code 310.

Figure 4:
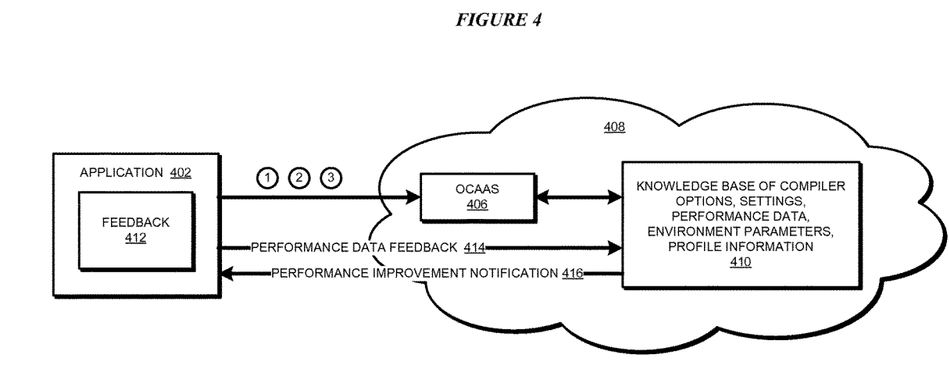
FIG. 4 depicts a block diagram of auto-tuning an OCaaS in accordance with an illustrative embodiment.

With reference to FIG. 4, this figure depicts a block diagram of auto-tuning an OCaaS in accordance with an illustrative embodiment. Application 402 is an example of application 302 with additional features as described herein. OCaaS 406 and cloud 408 are examples of OCaaS 306 and cloud 308, respectively, in FIG. 3.

In the manner described in FIG. 3, application 402 transmits (1) a pre-processed source code, (2) either all of the profile information or just the profile information of the profile-based selections, and (3) a set of environment parameters, to OCaaS 406. Using the received profile information and the environment parameters, OCaaS 406 queries knowledgebase 410.

Knowledgebase 410 includes a plurality of entries. Each entry in knowledgebase 410 includes a set of options applicable to OCaaS 406. Each set of options has a corresponding combination of factors in the entry. A combination of factors includes but is not limited to one or more levels of performances that can be expected from a compiled application when compiled using the set of options with OCaaS 406; one or more different profile information—e.g., hotness or coldness levels—to which a set of options applies; one or more different environment parameters for configuring a platform where the compiled application will operate; or different combinations thereof. OCaaS 406 uses the received profile information and the environment parameters to identify a set of options. OCaaS 406 uses the identified set of options to compile the received pre-processed source code into optimized object code.

Optionally, application 402 includes component 412. Component 412 collects actual performance data from an execution of the executable made from the optimized object code, where the execution occurs on the platform. Component 412 provides the actual performance data as feedback 414 to knowledgebase 410. Knowledgebase 410 updates or adds an entry therein using the actual performance data. The updated or new entry is used to select a set of options for OCaaS 406 in a future compilation operation.

Over time, knowledgebase 410 receives changed or new entries. The changed or new entries can be a result of performance data feedback from various executions on various platforms, evolution of OCaaS 406 with new or updated features, and other reasons. It is possible that a compilation performed using OCaaS 406 at one time can be improved upon at a later time using a new or changed entry in knowledgebase 410. According to one embodiment, application 402 receives one or more notification 416 informing application 402 about possible performance improvements by using a new or changed entry in knowledgebase 410. Using notification 416, application 402 may determine to perform the process depicted and described in FIG. 3 again and take advantage of the better performance available from OCaaS 406.

Figure 5:
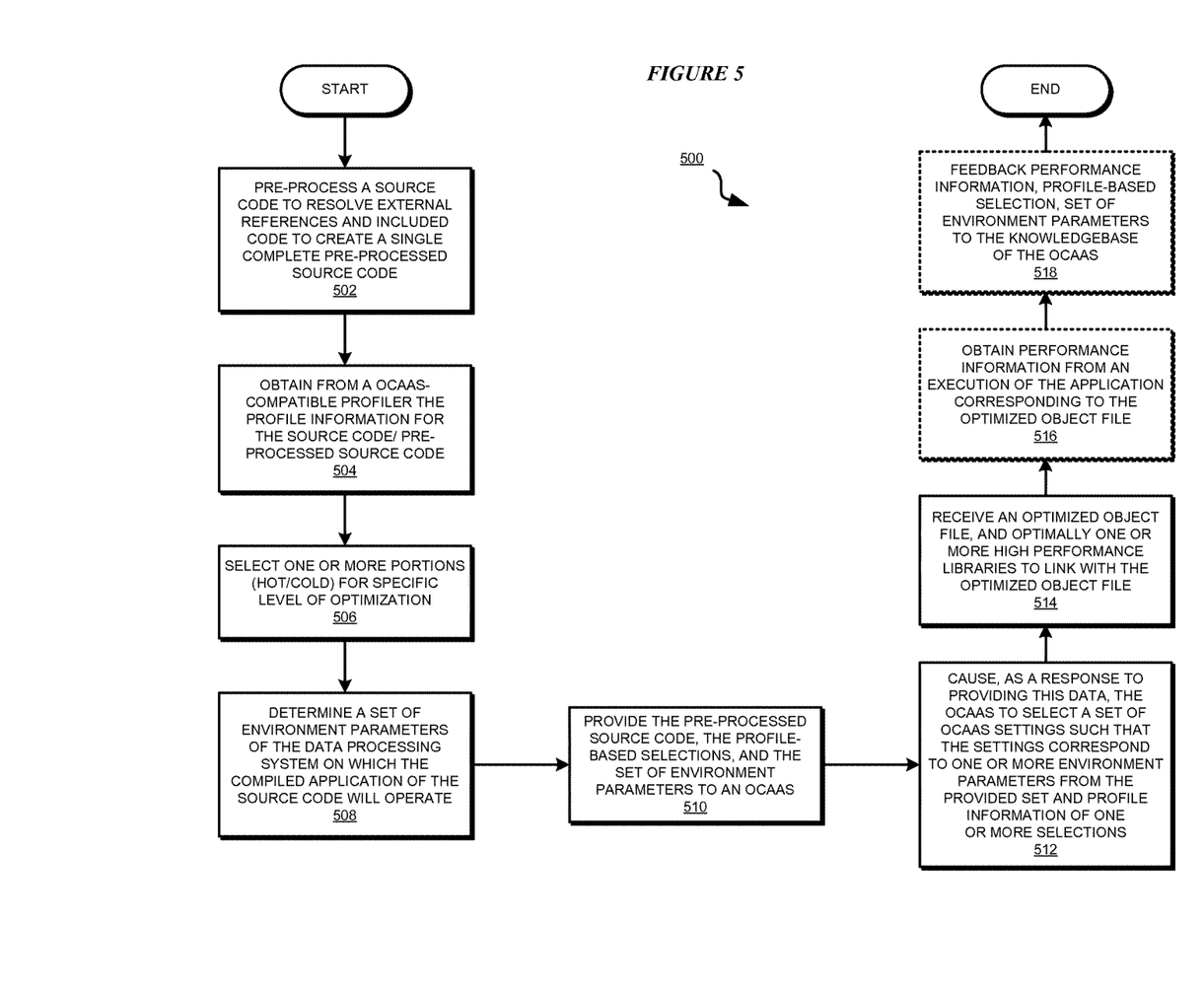
FIG. 5 depicts a flowchart of an example process for optimized compilation using an auto-tuned compiler as a service in accordance with an illustrative embodiment.

With reference to FIG. 5, this figure depicts a flowchart of an example process for optimized compilation using an auto-tuned compiler as a service in accordance with an illustrative embodiment. Process 500 can be implemented in application 402 in FIG. 4.

The application pre-processes a given source code to resolve the external references and create a complete pre-processes source code in a single file (block 502). The application obtains, from an OCaaS-compatible profiling application profile information for the source code (block 504).

The application receives a selection input to select one or more portions of the source code for corresponding one or more specific optimizations (block 506). The application determines a set of environment parameters that are applicable to the platform when and where the compiled application will operate (block 508).

The application provides the pre-processed source code, the profile information or the profile-based selections, and the set of environment parameters to an OCaaS (block 510). The application causes, in response to sending the profile information or the profile-based selections and the set of environment parameters, the OCaaS to select a set of settings, or compiler options (block 512). The OCaaS uses the set of settings to compile the pre-processed source code.

The application receives from the OCaaS the optimized object code resulting from the compilation (block 514). Optionally, the application also receives from the OCaaS one or more libraries, one or more references to libraries, or some combination thereof.

The application optionally collects performance data from an operation of the compiled application (block 516). The application optionally provides the performance data as feedback to the knowledgebase of the OCaaS (block 518). The application ends process 500 thereafter.

Thus, a computer implemented method, system or apparatus, and computer program product are provided in the illustrative embodiments for optimized compilation using an auto-tuned compiler as a service. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   pre-processing a source code of an application to form a pre-processed source code, wherein the source code refers to an external code in a separate file, and wherein the pre-processed source code creates a single file that includes the source code and the external code;
   profiling the source code to create profile information, the profile information identifying a hot portion having a first degree of hotness;
   determining a set of environment parameter values, the set of environment parameter values being applicable to a data processing system where the application will execute;
   causing, at a remote optimizing compiler, a selection of a set of compiler options from a knowledgebase, the selection corresponding to the profile information and the set of environment parameter values;
   obtaining, from the remote optimizing compiler, an object code resulting from compiling the pre-processed source code using the set of compiler options, wherein the object code is optimized according to the profile information, and the set of environment parameter values;
   building the executable application using the optimized object code; and
   identifying, in the profile information, a second hot portion having a second degree of hotness, wherein the hot portion is selected for optimization and the second hot portion is not selected for the optimization, the optimization being performed by the remote optimizing compiler.

2. The method of claim 1, further comprising:
   sending the pre-processed source code, the profile information, and the set of environment parameter values to the remote optimizing compiler.

3. The method of claim 1, wherein the remote optimizing compiler operates in a software as a service (SaaS) model.

4. The method of claim 1, wherein the knowledgebase comprises a plurality of entries, each entry comprising (i) an entry-specific set of compiler options, (ii) an entry-specific set of environment parameter values, and (iii) an entry-specific degree of hotness profile information.

5. The method of claim 1, wherein the set of environment parameter values is applicable at a time when the application will execute on the data processing system.

6. The method of claim 1, further comprising:
   using, as a part of the profiling, a profiler whose output is compatible with the optimizing compiler for use in the compilation.

7. The method of claim 1, further comprising:
identifying, in the profile information, a second hot portion having a second degree of hotness, wherein the hot portion is selected for a first optimization and the second hot portion is selected for a different optimization, the first optimization and the second optimization being performed by the remote optimizing compiler.

8. The method of claim 7, further comprising:
receiving an input from a visualization of the source code, the input selecting the hot portion and the second hot portion from a set of hot portions in the source code.

9. The method of claim 1, further comprising:
using, as a part of the pre-processing, a local compiler, the local compiler being resident on a machine in a network, the network allowing the local compiler to access the separate file.

10. The method of claim 1, wherein the method is embodied in a computer program product comprising one or more computer-readable storage devices and computer-readable program instructions which are stored on the one or more computer-readable storage devices and executed by one or more processors.

11. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

12. A computer program product comprising one or more computer-readable storage devices, and program instructions stored on at least one of the one or more storage devices, the stored program instructions comprising:
program instructions to pre-process a source code of an application to form a pre-processed source code, wherein the source code refers to an external code in a separate file, and wherein the pre-processed source code creates a single file that includes the source code and the external code;
program instructions to profile the source code to create profile information, the profile information identifying a hot portion having a first degree of hotness;
program instructions to determine a set of environment parameter values, the set of environment parameter values being applicable to a data processing system where the application will execute;
program instructions to cause, at a remote optimizing compiler, a selection of a set of compiler options from a knowledgebase, the selection corresponding to the profile information and the set of environment parameter values;
program instructions to obtain, from the remote optimizing compiler, an object code resulting from compiling the pre-processed source code using the set of compiler options, wherein the object code is optimized according to the profile information, and the set of environment parameter values;
program instructions to build the executable application using the optimized object code; and
program instructions to identify, in the profile information, a second hot portion having a second degree of hotness, wherein the hot portion is selected for a first optimization and the second hot portion is selected for a different optimization, the first optimization and the second optimization being performed by the remote optimizing compiler.

13. The computer program product of claim 12, the stored program instructions further comprising:
program instructions to send the pre-processed source code, the profile information, and the set of environment parameter values to the remote optimizing compiler.

14. The computer program product of claim 12, wherein the remote optimizing compiler operates in a software as a service (SaaS) model.

15. The computer program product of claim 12, wherein the knowledgebase comprises a plurality of entries, each entry comprising (i) an entry-specific set of compiler options, (ii) an entry-specific set of environment parameter values, and (iii) an entry-specific degree of hotness profile information.

16. The computer program product of claim 12, wherein the set of environment parameter values is applicable at a time when the application will execute on the data processing system.

17. The computer program product of claim 12, the stored program instructions further comprising:
program instructions to use, as a part of the profiling, a profiler whose output is compatible with the optimizing compiler for use in the compilation.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to pre-process a source code of an application to form a pre-processed source code, wherein the source code refers to an external code in a separate file, and wherein the pre-processed source code creates a single file that includes the source code and the external code;
program instructions to profile the source code to create profile information, the profile information identifying a hot portion having a first degree of hotness;
program instructions to determine a set of environment parameter values, the set of environment parameter values being applicable to a data processing system where the application will execute;
program instructions to cause, at a remote optimizing compiler, a selection of a set of compiler options from a knowledgebase, the selection corresponding to the profile information and the set of environment parameter values;
program instructions to obtain, from the remote optimizing compiler, an object code resulting from compiling the pre-processed source code using the set of compiler options, wherein the object code is optimized according to the profile information, and the set of environment parameter values;
program instructions to build the executable application using the optimized object code; and
program instructions to identify, in the profile information, a second hot portion having a second degree of hotness, wherein the hot portion is selected for a first optimization and the second hot portion is selected for a different optimization, the first optimization and the second optimization being performed by the remote optimizing compiler.

* * * * *